United States Patent
Wei et al.

(10) Patent No.: US 12,537,033 B2
(45) Date of Patent: Jan. 27, 2026

(54) STORAGE SYSTEM FOR PROCESSING GENOME SEQUENCES

(71) Applicant: MACRONIX INTERNATIONAL CO., LTD., Hsinchu (TW)

(72) Inventors: Ming-Liang Wei, Kaohsiung (TW); Hsiang-Pang Li, Zhubei (TW); You-Kai Zheng, Kaohsiung (TW); Chia-Lin Yang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 107 days.

(21) Appl. No.: 18/595,672

(22) Filed: Mar. 5, 2024

(65) Prior Publication Data
US 2024/0355390 A1    Oct. 24, 2024

Related U.S. Application Data

(60) Provisional application No. 63/460,620, filed on Apr. 20, 2023.

(51) Int. Cl.
*G16B 30/10* (2019.01)
*G11C 7/10* (2006.01)
*G16B 50/30* (2019.01)

(52) U.S. Cl.
CPC ........... *G11C 7/1006* (2013.01); *G16B 30/10* (2019.02); *G16B 50/30* (2019.02)

(58) Field of Classification Search
CPC ... G11C 7/1006; G11C 13/0019; G11C 13/02; G16B 30/10; G16B 50/30
See application file for complete search history.

(56) References Cited

U.S. PATENT DOCUMENTS

| | | |
|---|---|---|
| 2018/0004891 A1 | 1/2018 | Komar |
| 2020/0381082 A1* | 12/2020 | Xu ............... G16B 35/10 |
| 2021/0074381 A1* | 3/2021 | Rizk .............. G16B 30/20 |
| 2021/0287760 A1 | 9/2021 | Kim |
| 2022/0019441 A1 | 1/2022 | Rosing |

FOREIGN PATENT DOCUMENTS

| | | |
|---|---|---|
| CN | 112204666 A | 1/2021 |
| TW | 202142856 A | 11/2021 |

\* cited by examiner

*Primary Examiner* — Jay W. Radke
(74) *Attorney, Agent, or Firm* — McClure, Qualey & Rodack, LLP (57) ABSTRACT

A storage system capable of executing data processing, includes the following elements. A first control unit of a storage device, for cooperating with a sequencer to perform a clustering process on a plurality of original sequences to obtain a plurality of read sequences, generating a plurality of read binary vectors corresponding to the read sequences, and generating a pruned filtering binary vector according to a reference sequence. A first storage module of the storage device, for storing the read binary vectors and the pruned filtering binary vector, and executing an in-memory computing (IMC) according to the read binary vectors and the pruned filtering binary vector, so as to generate a filtered cluster read set. A processing device, for executing an aligning process according to the filtered cluster read set and the reference sequence.

16 Claims, 10 Drawing Sheets

Specification includes a Sequence Listing.

SEQUENCE LISTING

```
Sequence total quantity: 13
SEQ ID NO: 1                    moltype = DNA  length = 11
FEATURE                         Location/Qualifiers
source                          1..11
                                mol_type = unassigned DNA
                                organism = unidentified
SEQUENCE: 1
aaaaagacca a                                                                    11

SEQ ID NO: 2                    moltype = DNA  length = 10
FEATURE                         Location/Qualifiers
source                          1..10
                                mol_type = unassigned DNA
                                organism = unidentified
SEQUENCE: 2
attaggacca                                                                      10

SEQ ID NO: 3                    moltype = DNA  length = 10
FEATURE                         Location/Qualifiers
source                          1..10
                                mol_type = unassigned DNA
                                organism = unidentified
SEQUENCE: 3
ttaggaccac                                                                      10

SEQ ID NO: 4                    moltype = AA  length = 5
FEATURE                         Location/Qualifiers
source                          1..5
                                mol_type = protein
                                organism = unidentified
SEQUENCE: 4
ATTAG                                                                           5

SEQ ID NO: 5                    moltype = AA  length = 5
FEATURE                         Location/Qualifiers
source                          1..5
                                mol_type = protein
                                organism = unidentified
SEQUENCE: 5
TTAGG                                                                           5

SEQ ID NO: 6                    moltype = AA  length = 5
FEATURE                         Location/Qualifiers
source                          1..5
                                mol_type = protein
                                organism = unidentified
SEQUENCE: 6
TAGGA                                                                           5

SEQ ID NO: 7                    moltype = AA  length = 5
FEATURE                         Location/Qualifiers
source                          1..5
                                mol_type = protein
                                organism = unidentified
SEQUENCE: 7
AGGAC                                                                           5

SEQ ID NO: 8                    moltype = AA  length = 5
FEATURE                         Location/Qualifiers
source                          1..5
                                mol_type = protein
                                organism = unidentified
SEQUENCE: 8
GGACC                                                                           5

SEQ ID NO: 9                    moltype = AA  length = 5
FEATURE                         Location/Qualifiers
source                          1..5
                                mol_type = protein
                                organism = unidentified
SEQUENCE: 9
GACCA                                                                           5

SEQ ID NO: 10                   moltype = AA  length = 5
FEATURE                         Location/Qualifiers
source                          1..5
                                mol_type = protein
                                organism = unidentified
```

```
SEQUENCE: 10
ACCAC                                                                            5

SEQ ID NO: 11          moltype = AA   length = 5
FEATURE                Location/Qualifiers
source                 1..5
                       mol_type = protein
                       organism = unidentified
SEQUENCE: 11
AAAAA                                                                            5

SEQ ID NO: 12          moltype = AA   length = 5
FEATURE                Location/Qualifiers
source                 1..5
                       mol_type = protein
                       organism = unidentified
SEQUENCE: 12
TTTTT                                                                            5

SEQ ID NO: 13          moltype = AA   length = 5
FEATURE                Location/Qualifiers
source                 1..5
                       mol_type = protein
                       organism = unidentified
SEQUENCE: 13
TTTTG                                                                            5
```

STORAGE SYSTEM FOR PROCESSING GENOME SEQUENCES

This application claims the benefit of U.S. provisional application Ser. No. 63/460,620, filed Apr. 20, 2023, the subject matter of which is incorporated herein by reference.

SEQUENCE LISTING

This application incorporates in its entirety the Sequence Listing in ST.26 XML format entitled "251310-7410" (12,256 bytes), which was created on Dec. 24, 2025, and filed electronically herewith.

TECHNICAL FIELD

The present disclosure relates to a storage system, and in particular relates to a storage system for processing genome sequences.

BACKGROUND

In applications of biotechnology, data processing for genome sequencing is often required. Applications include as biofuels and replicating organisms, etc. In the data processing of genome sequencing, locations of the genome sequences prepared by the laboratory with respect to the standard reference sequence are calculated, so as to map the read sequences of the laboratory to corresponding locations of the reference sequence, which is referred to as "read mapping".

However, the lengths of the genome sequences are relatively long, and the processing of read mapping often consumes a large amount of computing resources. Also, operating errors in read mapping may be caused by genome abnormalities in the sequences. Furthermore, in traditional processing procedure of read mapping, subsequences of the reference sequence are stored in memory strings of bit lines of the memory, and the read sequences are inputted into word lines of the memory. However, the manner the subsequences of the reference sequence and the read sequences are stored may affect the computing efficiency.

It is desirable to improve the processing of genome sequences, which may improve computing efficiency and accuracy of read mapping.

SUMMARY

According to an aspect of the present disclosure, a storage system is provided. The storage system includes the following elements. A first control unit of a storage device, for cooperating with a sequencer to perform a clustering process on a plurality of original sequences to obtain a plurality of read sequences, wherein the read sequences form a cluster read set, and each of the read sequences includes a plurality of nucleotides of a genome fragment. Furthermore, the first control unit generates a plurality of read binary vectors corresponding to the read sequences, and generates a pruned filtering binary vector according to a reference sequence. A first storage module of the storage device, for storing the read binary vectors and the pruned filtering binary vector, and executing an in-memory computing (IMC) according to the read binary vectors and the pruned filtering binary vector, so as to generate a filtered cluster read set. And, a processing device, coupled to the storage device, is configured to perform an aligning process according to the filtered cluster read set and the reference sequence.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 1A:
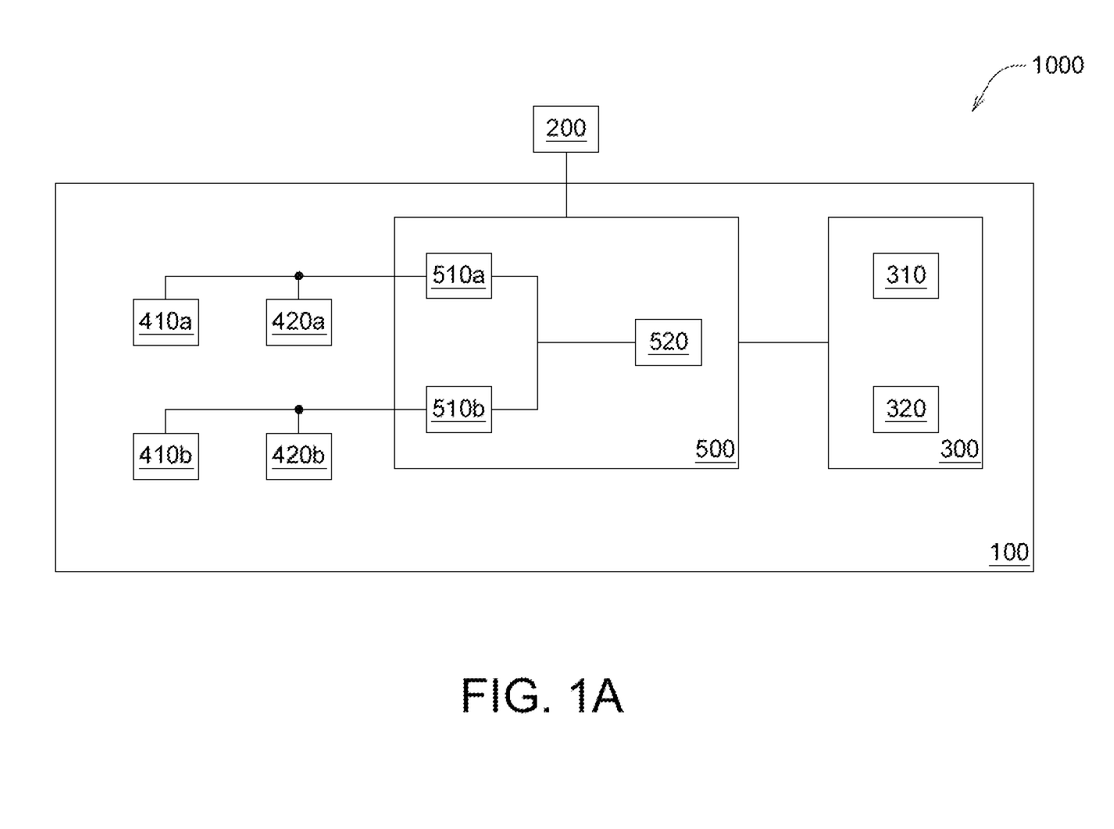
FIG. 1A is a functional block diagram of a storage system 1000 according to an embodiment of the present disclosure.

FIG. 1A is a functional block diagram of a storage system 1000 capable of executing data processing according to an embodiment of the present disclosure. Referring to FIG. 1A, the storage system 1000 includes a storage device 100 and a processing device 200. The processing device 200 is a host processor, i.e., a processor disposed at the host. The processing device 200 is, for example, a central processing unit (CPU) or a micro control unit (MCU) of a personal computer or a server. The processing device 200 may also be realized by a field programmable gate array (FPGA).

On the other hand, the storage device 100 is a peripheral device coupled to the host. The storage device 100 may be a solid-state drive (SSD), such as a solid-state drive based on NAND flash memory. The storage device 100 includes a control module 500 and storage modules 300, 410*a*, 420*a*, 410*b* and 420*b*.

The storage module 300 of the storage device 100 is, for example, a dynamic random access memory (DRAM), and the storage module 300 includes a storage unit 310 and a storage unit 320. The storage modules 410*a*, 420*a*, 410*b*, and 420*b* are, for example, NAND dies. The storage modules 410*a* and 410*b* are used to perform in-memory computing (IMC). The storage modules 420*a* and 420*b* are used to perform general storage functions. The control module 500 is, for example, a controller of the solid-state drive, and the control module 500 includes control units 510*a*, 510*b* and 520. The control units 510a and 510b are, for example, flash controllers. The control unit 520 is, for example, a core controller.

The control unit 510a is coupled to the storage modules 410a and 420a, and the control unit 510b is coupled to the storage modules 410b and 420b. The processing device 200 and the storage module 300 are coupled to the control module 500.

Figure 1B:
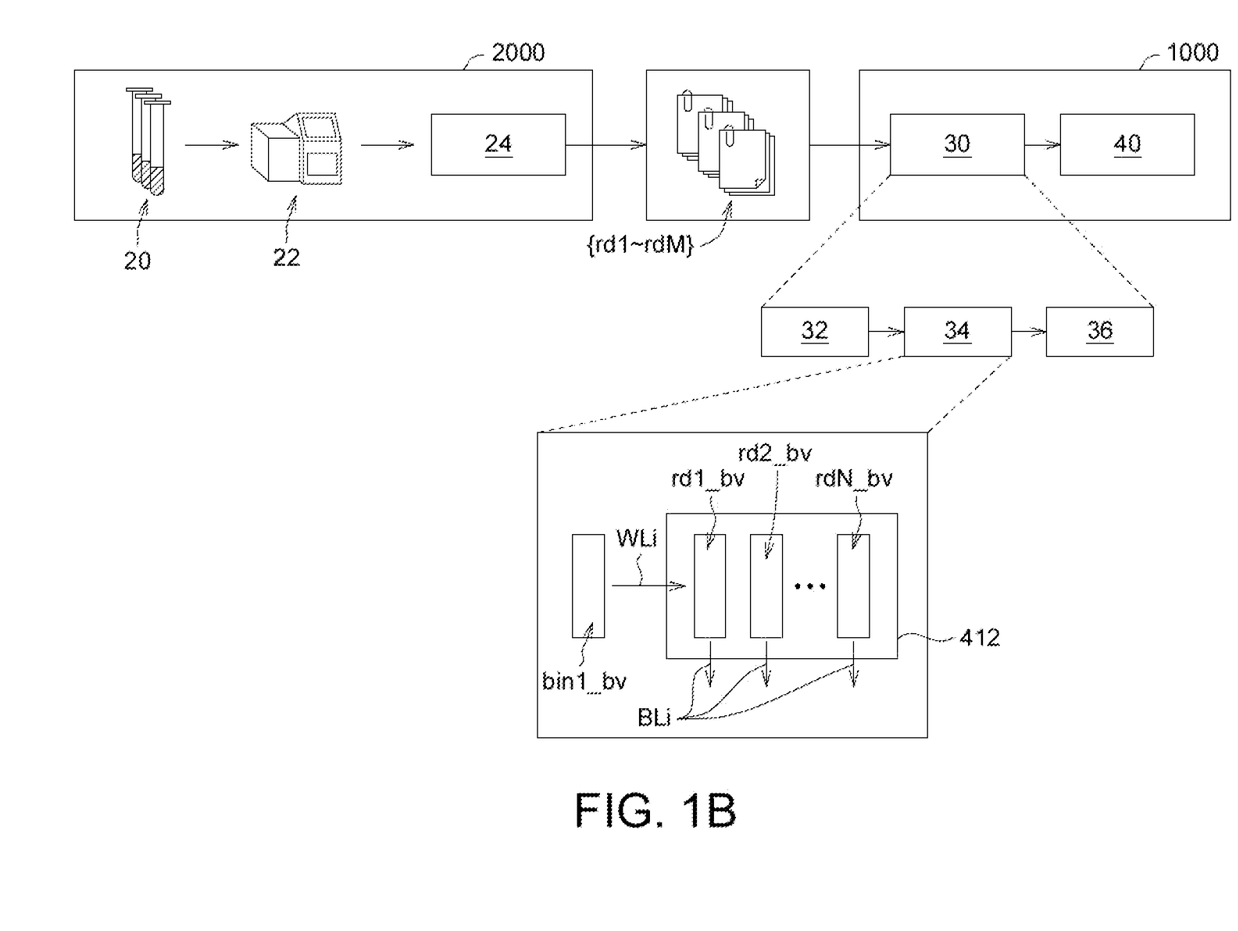
FIG. 1B is a schematic diagram of an embodiment of the operation of the storage system 1000.

Next, please refer to FIG. 1B, which shows a schematic diagram of an embodiment of the operation of the storage system 1000. In the laboratory 2000, a sample 20 of genome sequences are firstly sorted by a sequencer 22, and then pre-processed by the pre-processing module 24 to obtain a plurality of original sequences rd1-rdM. Each of the original sequences rd1-rdM includes a plurality of nucleotides of a genome fragment, for example represented as: "A", "C", "G" and "T". Furthermore, the original sequences rd1-rdM are stored in a cache memory within the sequencer 22. The original sequences rd1-rdM are transformed by the sequencer 22 and then stored in the storage module 420a or 420b as shown in FIG. 1A.

The sequencer 22 includes a computer which reads the original sequences rd1-rdM, and executes a cluster process (i.e., grouping process) on the original sequences rd1-rdM to generate the binary vectors rd1_bv-rdN_bv. The storage system 1000 is used to perform an aligning process 30 to align several sequences in the original sequences rd1-rdM with the reference sequence ref0. The aligning processing 30 is also referred to as "mapping process" of read sequences. After the aligning process 30, a downstream analysis 40 is performed on the original sequence rd1-rdM.

The aligning process 30 may include a seeding phase 32, a filtering phase 34 and an aligning phase 36. In the seeding phase 32, the computer within the sequencer 22 performs a clustering process to obtain N read sequences rd1-rdN, which are clustered, from the original sequences rd1-rdM. The clustered read sequences rd1-rdN are similar to one another. Each of the read sequences rd1-rdN has a length "k1", and each of the read sequences rd1-rdN includes k1 nucleotides. For example, the length k1 is equal to 10, and the read sequence rd1 is represented as "ATTAGGACCA", and the read sequence rd2 is represented as "TTAGGAC-CAC". These read sequences rd1-rdN form a cluster read set CRD.

Moreover, the control unit 520 of the control module 500, cooperating with the sequencer 22, generates a plurality of "seeds" according to the reference sequence ref0, and possible permutations of the seeds are referred to as "tokens". Each seed has a length "k2", which includes k2 nucleotides. Seeds are also referred to as "k-mers". For example, when the length k2 of the seed is equal to 5, the seed may include "ATTAG", "TTAGG", "TAGGA", "AGGAC", "GGACC", "GACCA" and "ACCAC". The length k1 of each read sequence rd1-rdN is greater than the length k2 of each seed.

Then, in the filtering phase 34, the control module 500 cooperates with the storage modules 410a, 420a, 410b, and 420b to perform a filtering process, so as to filter out a portion of the N read sequences rd1-rdN of the cluster read set CRD. The control module 500 selects a subsequence bin1 from the reference sequence ref0, and generates a binary vector bin1_bv of the subsequence bin1. Moreover, the control module 500 generates read binary vectors rd1_bv-rdN_bv of the read sequences rd1-rdN.

Taking the storage module 410a as an example, the storage block 412 in FIG. 1B is a NAND block in the storage module 410a. Each memory string of each bit line BLi of the storage block 412 stores a corresponding one of the read binary vectors rd1_bv-rdN_bv. Moreover, according to a direction of each word line WLi, the storage block 412 receives the binary vector bin1_bv of the selected subsequence bin1. Then, the storage block 412 performs an in-memory computation to calculate a similarity-degree of the read sequences rd1-rdN according to the binary vector bin1_bv, so as to filter out read sequences with a lower similarity-degree, among the read sequences rd1-rdN.

Then, in the aligning phase 36, the processing device 200 aligns the filtered read sequences to the reference sequence ref0, according to each location x(i) of the filtered read sequences with respect to the reference sequence ref0.

Figure 1C:
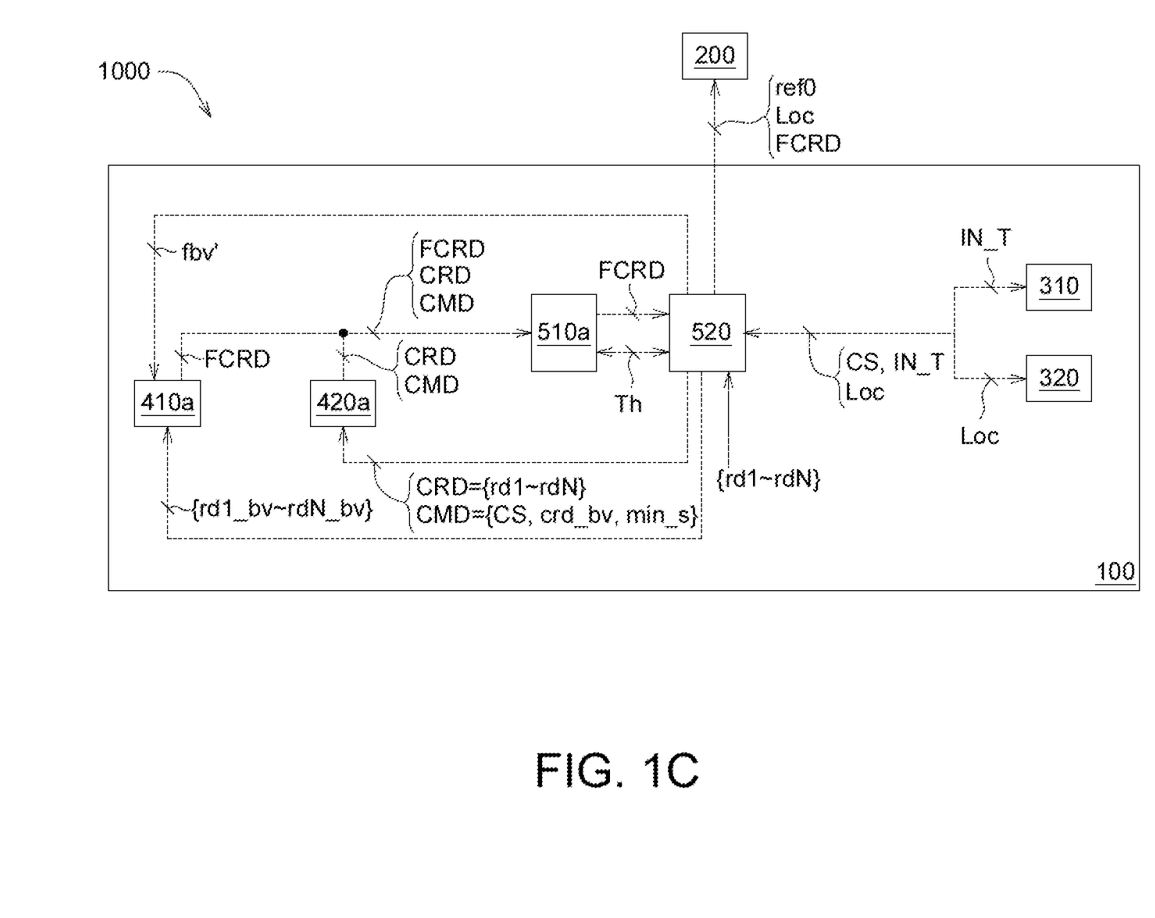
FIG. 1C is a schematic diagram of data and signal transmission of the storage system 1000.

Next, please refer to FIG. 1C, which shows a schematic diagram of data and signal transmission of the storage system 1000, to describe the operation of the storage system 1000 in detail. The sequencer 22 shown in FIG. 1B performs the clustering process on the original sequences rd1-rdM to generate the read sequences rd1-rdN which are clustered. The clustered read sequences rd1-rdN and the binary vectors rd1_bv-rdN_bv are stored in the storage modules 420a and 420b by a storing instruction of the processing device 200.

In one example, the computer within the sequencer 22 may perform the clustering process on the original sequences rd1-rdM according to the "Locality Sensitive Hashing (LSH)" algorithm, so as to obtain N read sequences rd1-rdN which are clustered. The read sequences rd1-rdN form the cluster read set CRD, and the control unit 520 transmits the cluster read set CRD to the storage module 420a.

Moreover, the control unit 520, cooperating with the sequencer 22, obtains a cluster seed set CS according to the cluster read set CRD and a plurality of seeds with a length of k2. Moreover, the control unit 520 generates a location information Loc. The location information Loc includes a left offset L_ofs and a right offset R_ofs of each seed with respect to the read sequence. The control unit 520 transmits the cluster seed set CS to the storage unit 310, and transmits the location information Loc to the storage unit 320.

More specifically, the read sequence rd1 "ATT-AGGACCA" includes seeds "ATTAG", "TTAGG", "TAGGA", "AGGAC", "GGACC" and "GACCA". Wherein, the left offset L_ofs of the seed "ATTAG" in the read sequence rd1 "ATTAGGACCA" is "0" and the right offset R_ofs is "5". The seed "TTAGG" has left offset L_ofs of "1" and right offset R_ofs of "4" in the read sequence rd1 "ATTAGGACCA". The seed "TAGGA" has a left offset L_ofs of "2" and a right offset R_ofs of "3" in the read sequence rd1 "ATTAGGACCA". The seed "AGGAC" has a left offset L_ofs of "3" and a right offset R_ofs of "2" in the read sequence rd1 "ATTAGGACCA". The seed "GGACC" has a left offset L_ofs of "4" and a right offset R_ofs of "1" in the read sequence rd1 "ATTAGGACCA". The left offset L_ofs of the seed "GACCA" is "5" and the right offset R_ofs is "0" in the read sequence rd1 "ATTAGGACCA". Accordingly, the read sequence rd1 "ATTAGGACCA" may include {"ATTAG"-"TTAGG"-"TAGGA"-"AGGAC"-"GGACC"-"GACCA"}. The left offset L_ofs and right offset R_ofs of each of the above seeds in the read sequence rd1 "ATT-AGGACCA" may be shown in Table 1-1.

TABLE 1-1

| ATTAGGACCA | | |
|---|---|---|
| L_ofs = 0 | ATTAG | R_ofs = 5 |
| L_ofs = 1 | TTAGG | R_ofs = 4 |

TABLE 1-1-continued

| ATTAGGACCA | | |
|---|---|---|
| L_ofs = 2 | TAGGA | R_ofs = 3 |
| L_ofs = 3 | AGGAC | R_ofs = 2 |
| L_ofs = 4 | GGACC | R_ofs = 1 |
| L_ofs = 5 | GACCA | R_ofs = 0 |

On the other hand, the read sequence rd2 "TTAGGAC-CAC" comprises seeds "TTAGG", "TAGGA", "AGGAC", "GGACC", "GACCA" and "ACCAC". Wherein, the left offset L_ofs of the seed "TTAGG" in the read sequence rd2 "TTAGGACCAC" is "0" and its right offset R_ofs is "5". The seed "TAGGA" has left offset L_ofs of "1" and right offset R_ofs of "4" in the read sequence rd2 "TTAGGAC-CAC". The seed "AGGAC" has a left offset L_ofs of "2" and a right offset R_ofs of "3" in the read sequence rd2 "TTAGGACCAC". The seed "GGACC" has a left offset L_ofs of "3" and a right offset R_ofs of "2" in the read sequence rd2 "TTAGGACCAC". The seed "GACCA" has a left offset L_ofs of "4" and a right offset R_ofs of "1" in the read sequence rd2 "TTAGGACCAC". The left offset L_ofs of the seed "ACCAC" is "5" and the right offset R_ofs is "0" in the read sequence rd2 "TTAGGACCAC". Accordingly, the read sequence rd2 "TTAGGACCAC" may include {"TTAGG"-"TAGGA"-"AGGAC"-"GGACC"-"GACCA"-"ACCAC"}. The left offset L_ofs and the right offset R_ofs of each of the above seeds in the read sequence rd2 "TTAGGACCAC" may be shown in Table 1-2.

TABLE 1-2

| TTAGGACCAC | | |
|---|---|---|
| L_ofs = 0 | TTAGG | R_ofs = 5 |
| L_ofs = 1 | TAGGA | R_ofs = 4 |
| L_ofs = 2 | AGGAC | R_ofs = 3 |
| L_ofs = 3 | GGACC | R_ofs = 2 |
| L_ofs = 4 | GACCA | R_ofs = 1 |
| L_ofs = 5 | ACCAC | R_ofs = 0 |

The read sequence rd1 and read sequence rd2 share five identical seeds "TTAGG", "TAGGA", "AGGAG", "GGACC" and "GAGGA". That is, these five identical seeds are an intersection INS_12 of the seeds of read sequence rd1 and the seeds of read sequence rd2. On the other hand, an union UN_12 of the seeds of read sequence rd1 and the seeds of read sequence rd2 are seven seeds "ATTAG", "TTAGG", "TAGGA", "AGGAG", "GGACC", "GAGGA" and "AGGAG". The cluster seed set CS comprises the seven seeds of the union UN_12 mentioned above. Based on the clustering process of the LSH algorithm, a probability Pr that the read sequence rd1 and the read sequence rd2 belong to the same cluster read set CRD is shown in formula (1). Probability Pr is related to a "JAC-CARD similarity".

$$Pr = \frac{\text{intersection INS\_12 of seeds of read sequence } rd1 \text{ and read sequence } rd2}{\text{union UN\_12 of seeds of sequence } rd1 \text{ and read sequence } rd2} \quad (1)$$

The maximum value of the left offset L_ofs of the seed in the read sequence rd1 and the read sequence rd2 is the "maximum left offset max_L_ofs", and the maximum value of the right offset R_ofs of the seed in the read sequence rd1 and the read sequence rd2 is the "maximum right offset max_R_ofs", as shown in Table 1-3. Taking the seed "GACCA" in the cluster seed set CS as an example, the maximum left offset max_L_ofs is equal to 5, and the maximum right offset max_R_ofs is equal to 1.

TABLE 1-3

| ATTAG | L_ofs = 0 | R_ofs = 5 |
|---|---|---|
| TTAGG | max_L_ofs = max(1, 0) = 1 | max_R_ofs = max(4, 5) = 5 |
| TAGGA | max_L_ofs = max(2, 1) = 2 | max_R_ofs = max(3, 4) = 4 |
| AGGAC | max_L_ofs = max(3, 2) = 3 | max_R_ofs = max(2, 3) = 3 |
| GGACC | max_L_ofs = max(4, 3) = 4 | max_R_ofs = max(1, 2) = 2 |
| GACCA | max_L_ofs = max(5, 4) = 5 | max_R_ofs = max(0, 1) = 1 |
| ACCAC | L_ofs = 5 | R_ofs = 0 |

The maximum left offset max_L_ofs and the maximum right offset max_R_ofs may indicate the possible location x1 of the read sequence rd1 and the cluster seed set CS with respect to the reference sequence ref0, and the possible location x2 of the read sequence rd2 and the cluster seed set CS with respect to the reference sequence ref0. The location information Loc further comprises the aforementioned locations x1 and x2.

The control unit 520, cooperating with the sequencer 22, queries or selects the subsequence bin1 of the reference sequence ref0 according to the maximum left offset max_L_ofs and the maximum right offset max_R_ofs. As shown in Tables 1-4, the queried subsequence bin1 may cover the read sequences rd1 and rd2. From another point of view, the locations x1 and x2 may also represent: the possible location of the subsequence bin1 with respect to the reference sequence ref0.

TABLE 1-4

| seed | GACCA |
|---|---|
| max_R_ofs = 1 | A |
| max_L_ofs = 5 | AAAAA |
| subsequence bin1 | AAAAAGACCAA |
| read sequence rd1 | ATTAGGACCA |
| read sequence rd2 | TTAGGACCAC |

On the other hand, the control unit 520 performs a mapping process according to the cluster seed set CS to generate read binary vectors rd1_bv-rdN_bv of the read sequences rd1-rdN. Wherein, read sequence rd1 has read binary vector rd1_bv, and read sequence rd2 has read binary vector rd2_bv. The control unit 520 transmits the read binary vectors rd1_bv-rdN_bv to the storage module 410a. As shown in FIG. 1B, in the storage block 412 of the storage module 410a, the read binary vectors rd1_bv-rdN_bv are stored in a corresponding memory string of each bit line BLi.

Figure 2A:
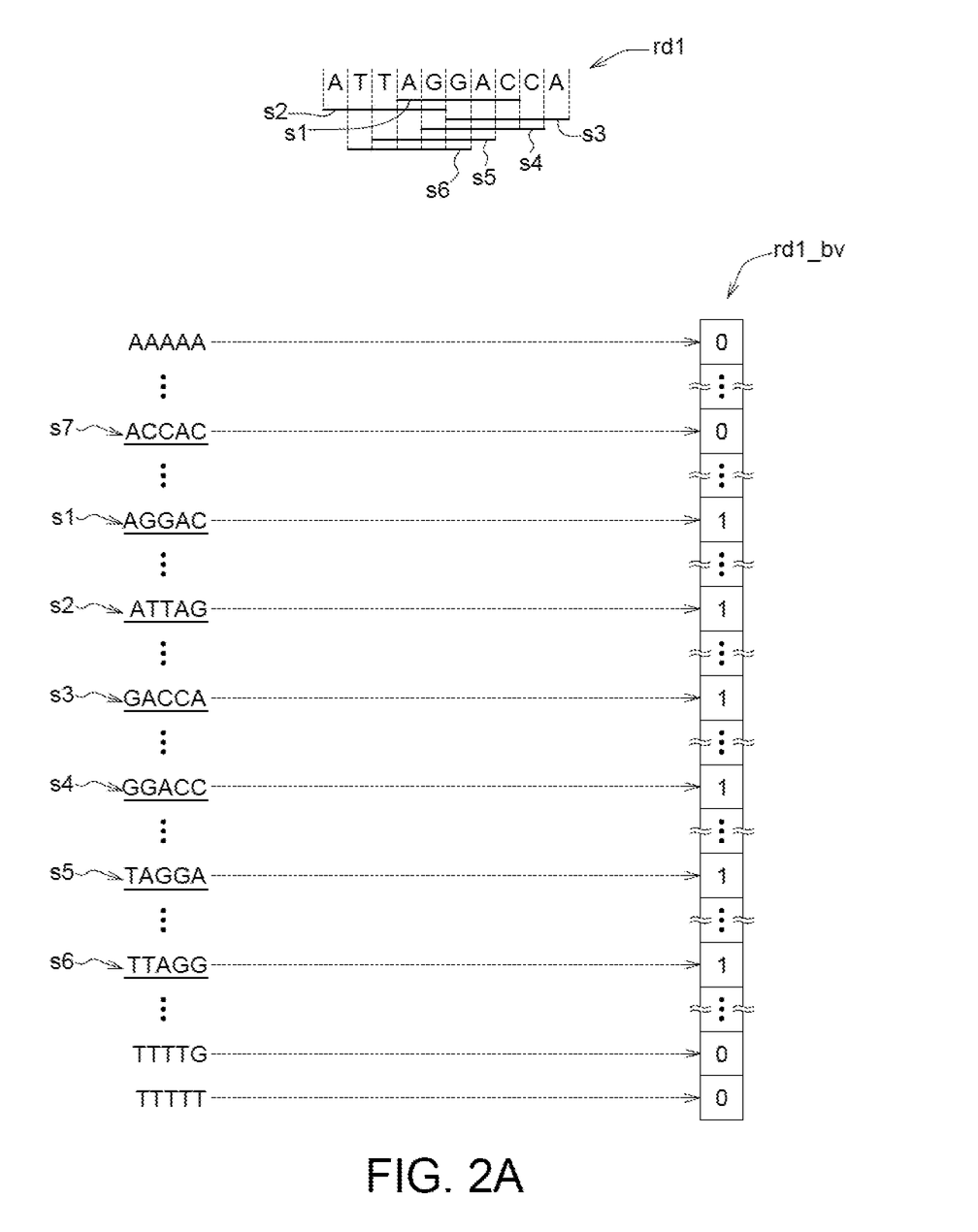
FIG. 2A is a schematic diagram of the control unit 520 generating the read binary vector rd1_bv.

Next, refer to FIG. 2A, which shows a schematic diagram of the control unit 520 generating the read binary vector rd1_bv. The cluster seed set CS comprises seven seeds s1-s7 of the union UN_12 of the read sequence rd1 and the read sequence rd2. The seed s1 is "AGGAC", the seed s2 is "ATTAG", the seed s3 is "GACCA", the seed s4 is "GGACC", the seed s5 is "TAGGA", the seed s6 is "TTAGG", and the seed s7 is "ACCAC". When the length k2 of the seed is equal to 5, and the seed comprises four genes A, C, G and T, the amount of permutations of all seeds of the length k2 is "4 to the 5th power" (equal to 1024). The seeds of 1024 permutations comprise "AAAAA" to "TTTTT".

The read binary vector rd1_bv comprises 1024 binary values corresponding to 1024 seeds respectively. The read sequence rd1 is "ATTAGGACCA", and the seeds s1-s6 exist in the read sequence rd1, hence the binary values of the read binary vector rd1_bv corresponding to the seeds s1-s6 are "1". The seed s7 does not exist in the read sequence rd1, hence the binary value of the read binary vector rd1_bv corresponding to the seed s7 is "0". The binary values of the read binary vector rd1_bv corresponding to other seeds other than the seeds s1-s7 (i.e., the cluster seed set CS) are also "0". The read binary vector rd1_bv comprises six binary values of "1".

Figure 2B:
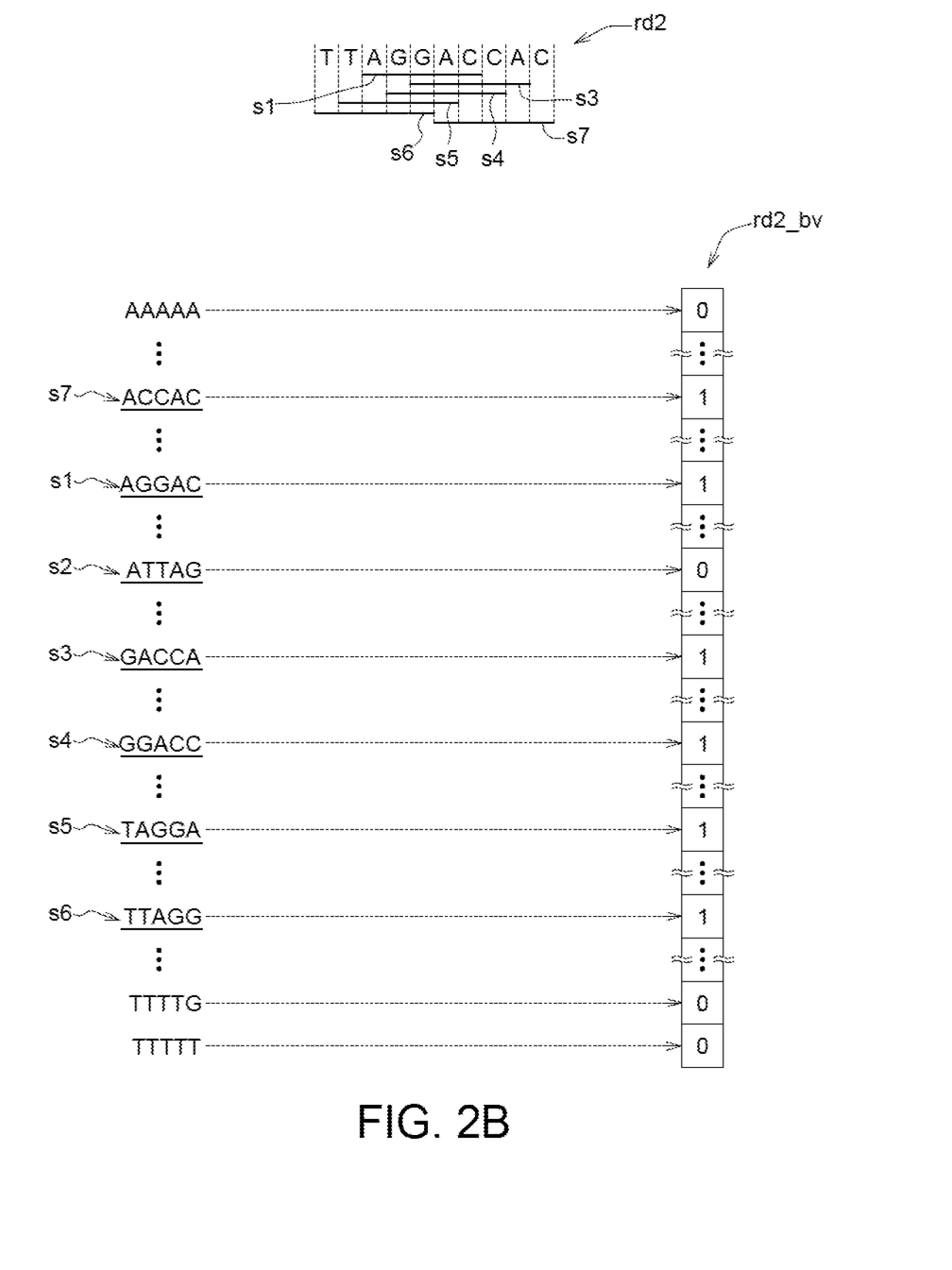
FIG. 2B is a schematic diagram of the control unit 520 generating the read binary vector rd2_bv.

Next, please refer to FIG. 2B, which shows a schematic diagram of the control unit 520 generating the read binary vector rd2_bv. Similar to the read binary vector rd1_bv in FIG. 2A, the read binary vector rd2_bv also comprises 1024 binary values corresponding to 1024 possible seeds. The read sequence rd2 is "TTAGGACCAC", and the seeds s1 and s3-s7 exist in the read sequence rd2, so the binary values of the read binary vector rd2_bv corresponding to the seeds s1 and s3-s7 are "1". The seed s2 does not exist in the read sequence rd2, so the binary value of the read binary vector rd2_bv corresponding to the seed s2 is "0". The binary values of the read binary vector rd2_bv corresponding to other seeds other than the seeds s1-s7 are also "0". The read binary vector rd2_bv comprises six binary values of "1". The read binary vectors rd3_bv-rdN_bv of other read sequences rd3-rdN comprised in the cluster read set CRD are similar to the read binary vector rd1_bv in FIG. 2A and the read binary vector rd2_bv in FIG. 2B.

The read binary vector rd1_bv comprises six binary values of "1", and the read binary vector rd2_bv also comprises six binary values of "1". In each read binary vector of the cluster read set CRD, a minimum amount min_s of binary values of "1" are 6. The minimum amount min_s also indicates the minimum amount of seeds existing in each of read sequence rd1-rdN. On the other hand, the cluster metadata CMD may further comprise a cluster read binary vector crd_bv. The control unit 520 transmits the cluster metadata CMD to the storage module 420a.

Figure 2C:
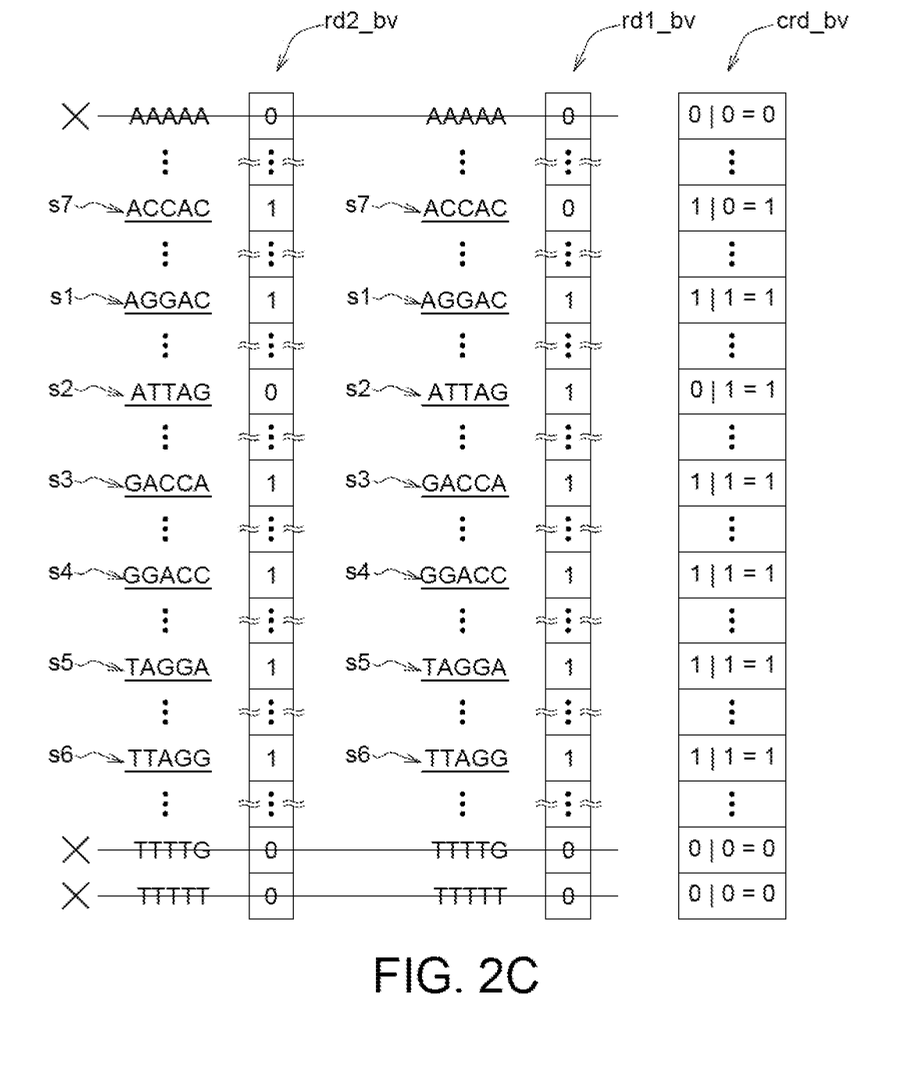
FIG. 2C is a schematic diagram of the control unit 520 generating the cluster read binary vector crd_bv.

Next, please refer to FIG. 2C, which shows a schematic diagram of the control unit 520 generating the cluster read binary vector crd_bv. The cluster read binary vector crd_bv comprises 1024 binary values, which are results of a logical "OR" operation of the binary values of the read binary vector rd1_bv and the binary values of the read binary vector rd2_bv. The binary values "1" of the cluster read binary vector crd_bv correspond to the seeds s1-s7 of the cluster seed set CS. For example, the seed s7 (i.e., "ACCAC") does not exist in read sequence rd1 but exists in read sequence rd2, the binary value of read binary vector rd1_bv corresponding to seed s7 is "0", the binary value of read binary vector rd2_bv corresponding to the seed s7 is "1". Therefore, the binary value of the cluster read binary vector crd_bv corresponding to the seed s7 is the result of the "OR" operation of "0" and "1", which is equal to "1". For another example, the seed s1 (that is, "AGGAC") exists in both the read sequence rd1 and the read sequence rd2, and the binary values of the read binary vector rd1_bv and the read binary vector rd2_bv corresponding to the seed s1 are both "1". Therefore, the binary value of the cluster read binary vector crd_bv corresponding to the seed s1 is "1".

The binary values of "0" of the cluster read binary vector crd_bv corresponds to other seeds (such as "AAAAA", "TTTTG", "TTTTT", etc.) other than seeds s1-s7, and the seeds corresponding to the binary values "0" of the cluster read binary vector crd_bv may be pruned out without storing in the storage module 420a. Accordingly, the storage module 420a does not need to store all 1024 seeds, which greatly saves storage space. In one example, the cluster metadata CMD may further comprise an information of the pruned-out seeds (i.e., information of the location of binary values of "0" in the cluster read binary vector crd_bv).

Figure 3A:
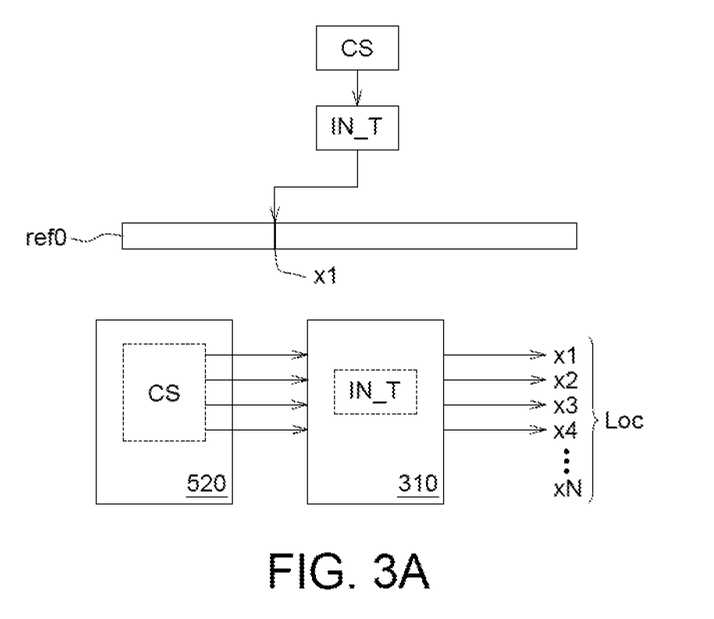
FIG. 3A is a schematic diagram of the control unit 520 generating the location information Loc.

Next, please refer to FIG. 3A, which shows a schematic diagram of the control unit 520 generating the location information Loc. The control unit 520 firstly establishes an index table IN_T according to the cluster seed set CS, and the control unit 520 transmits the index table IN_T to the storage unit 310. The index table IN_T may indicate the locations x1, x2, x3, x4, . . . , xN. These locations x1-xN are included in the location information Loc.

Figure 3B:
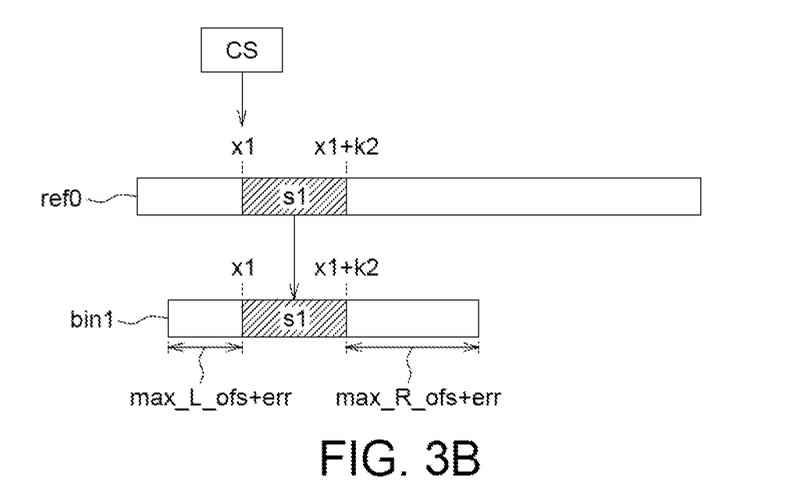
FIG. 3B is a schematic diagram of the control unit 520 generating the subsequence bin1 of the reference sequence ref0.

Next, please refer to FIG. 3B, which shows a schematic diagram of the control unit 520 generating the subsequence bin1 of the reference sequence ref0. The seed s1 (i.e., "AGGAC") of the seeds in the cluster seed set CS is at location x1 with respect to the reference sequence ref0. The seed s1 has a length k2, hence seed s1 has a right boundary x1+k2. Shifting from the location x1 to the left to obtain a left boundary of the subsequence bin1, and the amount of shifting is the maximum left offset max_L_ofs plus an error tolerance err. In addition, a right boundary of the subsequence bin1 is obtained by shifting from the right boundary x1+k2 of the seed s1 to the right, and the amount of shifting is the maximum right offset max_R_ofs plus the error tolerance err.

Figure 3C:
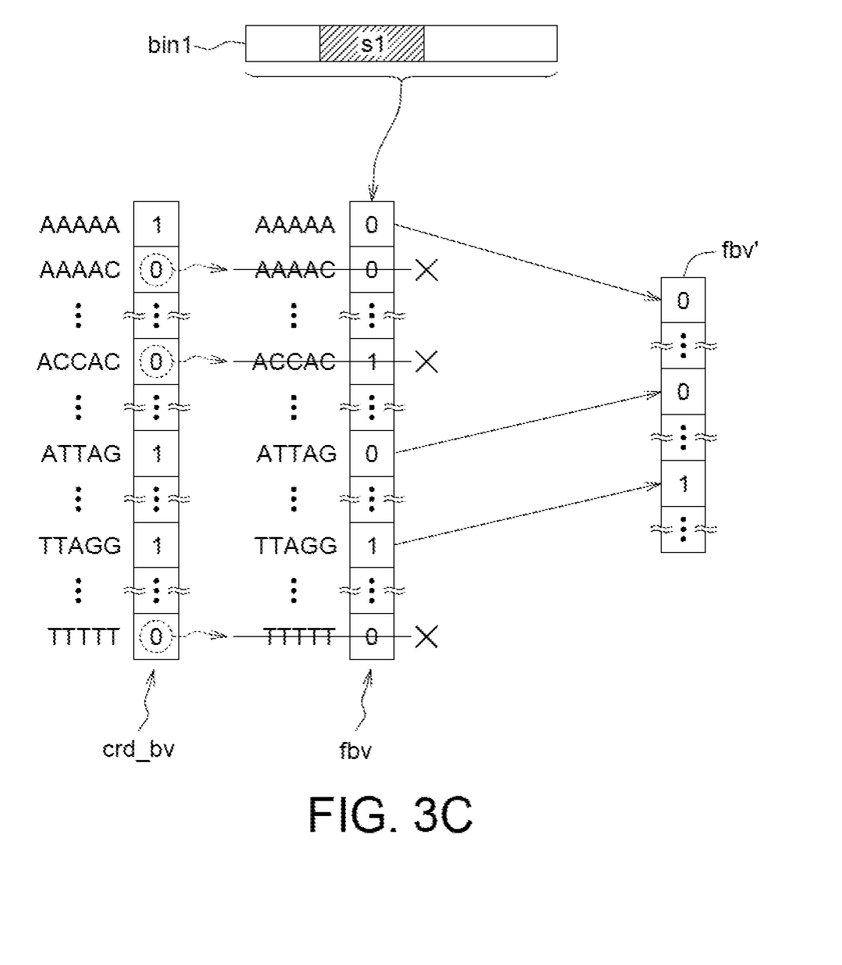
FIG. 3C is a schematic diagram of the control unit 520 generating the pruned filtering binary vector fbv'.

Next, please refer to FIG. 3C, which shows a schematic diagram of the control unit 520 generating the pruned filtering binary vector fbv'. In the filtering phase 34 of the storage system 1000 (the filtering phase 34 is shown in FIG. 1B), firstly, the control unit 520 generates the filtering binary vector fbv. The generation of the filter binary vector fbv is similar to those of the read binary vectors rd1_bv and rd2_bv in FIGS. 2A and 2B.

The filtering binary vector fbv corresponds to the subsequence bin1 generated in FIG. 3B. If the seed exists in the subsequence bin1, the binary value of the filtering binary vector fbv is "1" which corresponds to the existing seed, otherwise the binary value is "0". That is, the filtering binary vector fbv corresponding to the subsequence bin1 is substantially identical to the binary vector bin1_bv of the subsequence bin1 in FIG. 1B.

Then, the control unit 520 performs a pruning operation on the filtering binary vector fbv. The pruning operation refers to the following: in the the filtering binary vector fbv, some portions corresponding to binary values "0" of the cluster read binary vector crd_bv, are pruned-out. After the pruning operation on the filtering binary vector fbv, a pruned filtering binary vector fbv' is obtained. The control unit 520 sends the pruned filtering binary vector fbv' to the storage module 410a.

Figure 4:
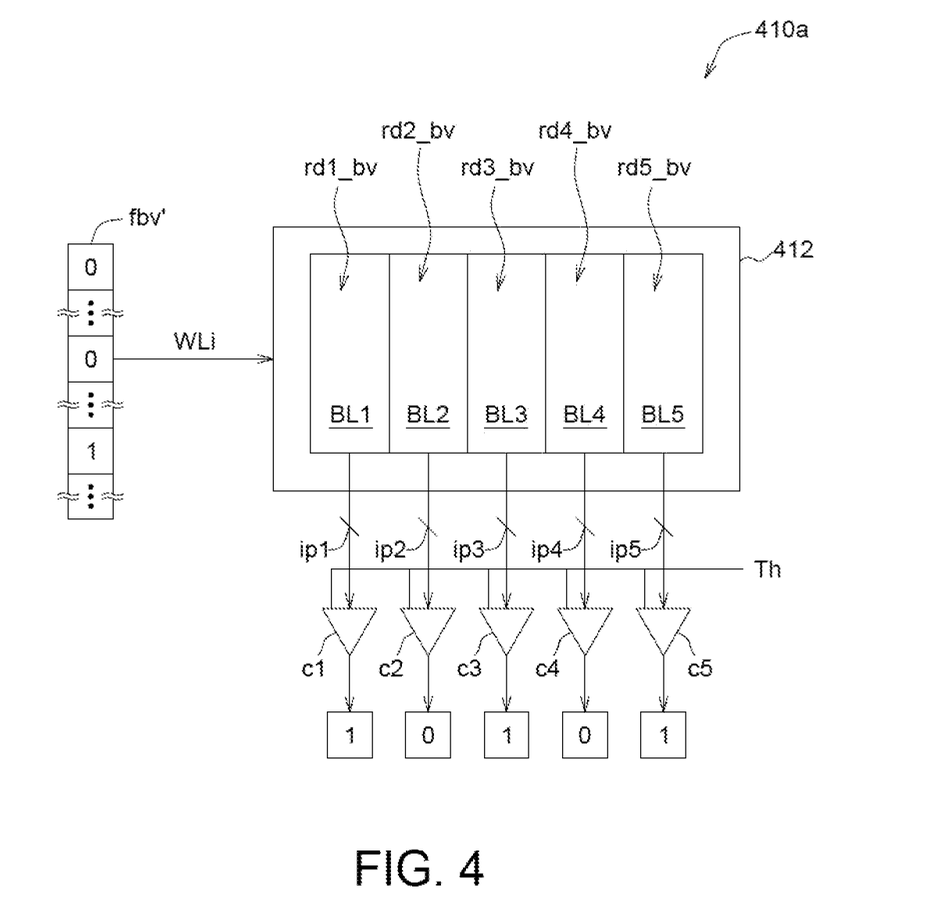
FIG. 4 is a schematic diagram of the storage module 410*a* performing in-memory computation.

Next, please refer to FIG. 4, which shows a schematic diagram of the storage module 410a performing in-memory computation. A storage block 412 of the storage module 410a comprises a plurality of word lines WLi and a plurality of bit lines BL1-BL5. Each of the bit lines BL1-BL5 has a memory string. The storage block 412 receives the pruned filtering binary vector fbv' from the direction of the word line WLi. On the other hand, taking the five read binary vectors rd1_bv-rd5_bv as an example, the memory strings of the bit lines BL1-BL5 of the storage block 412 correspondingly store the read binary vectors rd1_bv-rd5_bv. Accordingly, the storage block 412 of the storage module 410a performs an in-memory computation according to the pruned filtering binary vector fbv' and the read binary vector rd1_bv-rd5_bv, so as to perform inner product (or referred to as "dot product") operations on the pruned filtering binary vector fbv' with the read binary vectors rd1_bv-rd5_bv, in a manner of one-to-one, to obtain operating results ip1-ip5 respectively.

Then, the comparators c1-c5 compare the operating results ip1-ip5 with a threshold value Th respectively. For example, when the operating result ip1 is greater than the threshold value Th, the comparator c1 produces a comparing result "1", indicating that the pruned filtering binary vector fbv' has a greater correlation with the read binary vector rd1_bv, and the read binary vector rd1_bv may be reserved. On the other hand, if the operating result ip2 is less than the threshold value Th, the comparator c2 produces a comparing result "0", indicating that the pruned filtering binary vector fbv' has a smaller correlation with the read binary vector rd2_bv, hence the binary vector rd2_bv is not taken into consideration.

If the operating results ip1, ip3, and ip5 are greater than the threshold value Th, the read binary vectors rd1_bv, rd3_bv and rd5_bv are reserved, which correspond to the read sequences rd1, rd3, and rd5. It means that the read sequences rd1, rd3 and rd5 may be more related to the subsequence bin1 of the reference sequence ref0. Therefore, the read sequences rd1, rd3 and rd5 form a filtered cluster read set FCRD, which is provided to the processing device 200 for the aligning process.

The control unit 520 and the control unit 510a may calculate the threshold value Th according to formula (2). In formula (2), the term "min_s" is the minimum amount of the seeds, which represents the minimum value of the amount of seeds existing in each read sequence among all the read sequences rd1-rdN in the cluster read set CRD. The term "k2" is the length of the seed. The term "read_length" is the total amount of the seeds in the cluster read set CRD. The term "e" is an error tolerance rate. The term "read_length×e" represents the times of errors tolerable in each read sequence.

$$Th = \min\_s - k2 \times (\text{read\_length} \times e) \qquad (2)$$

Figure 5:
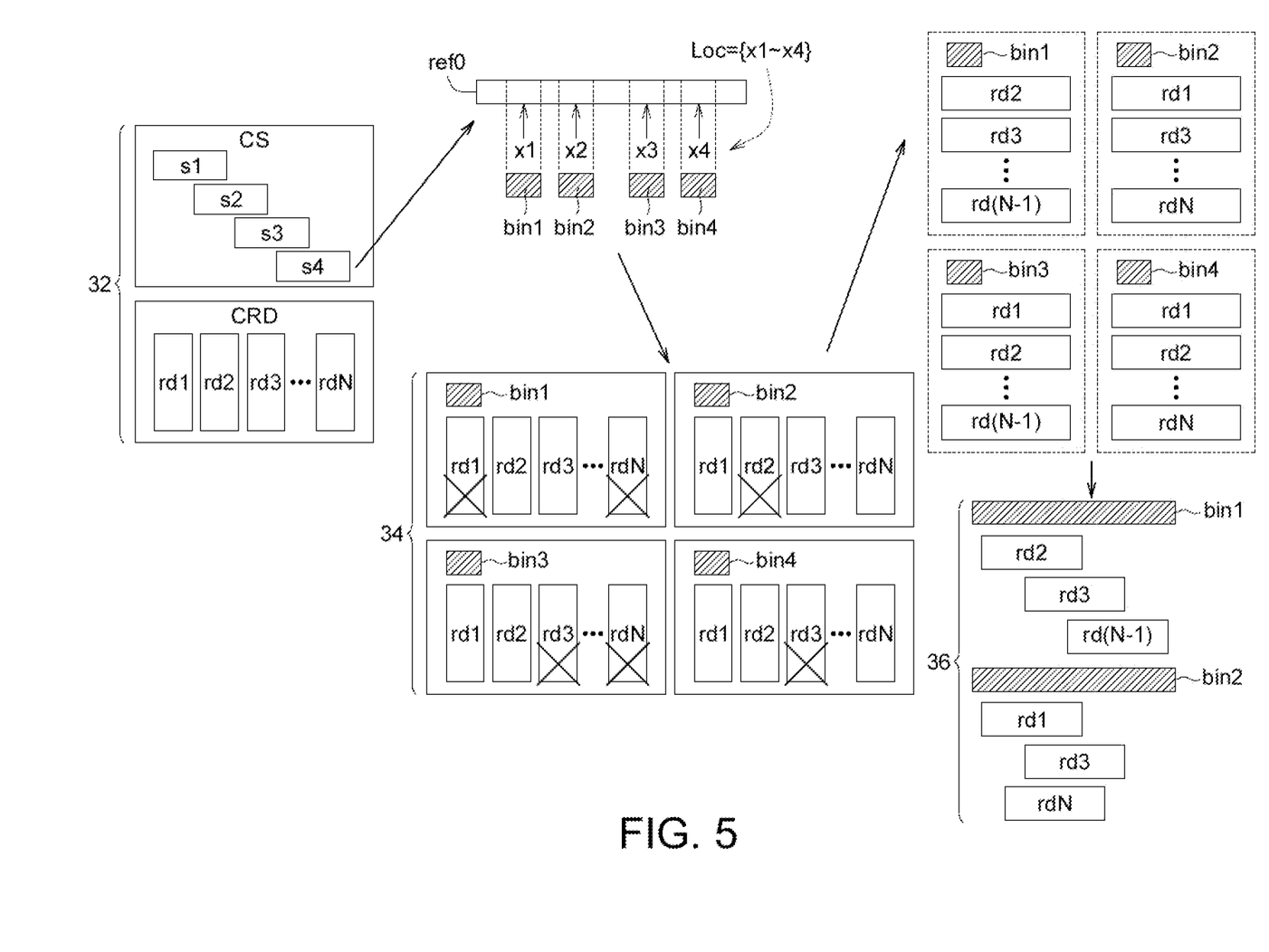
FIG. 5 is a schematic diagram of the operation of the storage system 1000 in the seeding phase 32, the filtering phase 34 and the aligning phase 36.

Next, please refer to FIG. 5, which shows a schematic diagram of the operation of the storage system 1000 in the seeding phase 32, the filtering phase 34 and the aligning phase 36. Firstly, in the seeding phase 32, clustering process is performed on the original sequences rd1-rdM prepared by the laboratory 2000 to obtain similar N read sequences rd1-rdN, and these read sequences rd1-rdN form a cluster read set CRD. And, a cluster seed set CS is generated, and the cluster seed set CS comprises seeds s1-s4, for example. The cluster seed set CS is substantially equivalent to the "representative seeds", which may cover several of the read sequences rd1-rdN. On the other hand, several subsequences bin1-bin4 are queried (or selected) from the reference sequence ref0. These subsequences bin1-bin4 are at locations x1-x4 with respect to the reference sequence ref0. The location information Loc comprises the locations x1-x4 of the subsequences bin1-bin4.

Then, in the filtering phase 34, in-memory computations are performed in the storage module 410a to filter out the read sequences, among the read sequences rd1-rdN, that are not related to the subsequences bin1-bin4. For example, for the subsequence bin1, its corresponding binary vector bin1_bv is firstly generated (the binary vector bin1_bv is substantially equivalent to the pruned filtering binary vector fbv' corresponding to the subsequence bin1). Furthermore, inner product operations of the read binary vectors rd1_bv-rdN_bv and the binary vector bin1_bv are performed in a storage block of the storage module 410a. The operating result ip1 of the inner product operation of the read binary vector rd1_bv and the binary vector bin1_bv is less than the threshold value Th, indicating that the read sequence rd1 is less related to the subsequence bin1, and the read sequence rd1 is filtered out. Similarly, if the operating result ipN of the inner product operation of the read binary vector rdN_bv and the binary vector bin1_bv is smaller than the threshold value Th, the read sequence rdN is filtered out. The read sequences rd2-rd(N-1), which are not filtered out, may form the filtered cluster read set FCRD.

Based on the similar filtering process, for the subsequence bin2, the operating result ip2 of the inner product operation of the read binary vector rd2_bv and the binary vector bin2_bv of the subsequence bin2 is smaller than the threshold value Th, indicating that the read sequence rd2 is not related to subsequence bin2, and the read sequence rd2 is filtered out. The read sequences rd1 and rd3-rdN, which are not filtered out, may form the filtered cluster read set FCRD.

Similarly, for the subsequence bin3, if the inner product operation result of the read binary vectors rd3_bv and rdN_bv and the binary vector bin3_bv is smaller than the threshold value Th, the read sequences rd3 and rdN are filtered out. The read sequences rd1, rd2 and rd4-rd(N-1) that are not filtered out may form the filtered cluster read set FCRD. For the subsequence bin4, if the inner product operation result of the read binary vector rd3_bv and the binary vector bin4_bv is smaller than the threshold value Th, the read sequence rd3 is filtered out. The read sequences rd1, rd2 and rd4-rdN that are not filtered out may form the filtered cluster read set FCRD.

Then, in the aligning phase 36, an aligning process is performed according to the preserved read sequences rd2-rd(N-1) with the subsequence bin1. Similarly, aligning process is performed according to the preserved read sequences rd1 and rd3-rdN with the subsequence bin2. In addition, an aligning process is performed according to the preserved read sequences rd1, rd2 and rd4-rd(N-1) with the subsequence bin3. Furthermore, an aligning process is performed according to the preserved read sequences rd1, rd2 and rd4-rdN with the subsequence bin4.

Before the aligning phase 36, the storage system 1000 of the present disclosure has performed the filtering process in the filtering phase 34, so as to filter out the read sequences, from the cluster read set CRD, that are less related to the subsequences bin1-bin4, and only using the filtered cluster read set FCRD to perform aligning process with the subsequences bin1-bin4, so that the execution efficiency of the aligning process may be greatly improved. In addition, before the filtering phase 34, the sequencer 22 has performed the clustering process on the original sequences rd1-rdM, so as to obtain clustered N read sequences rd1-rdN. Moreover, the cluster seed set CS corresponding to the clustered read sequences rd1-rdN is generated, and repeated seeds for the read sequences rd1-rdN are not needed to save, which may greatly save the storage space of the storage system 1000.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A storage system capable of executing data processing, comprising:
 a storage device, comprising:
  a first control unit, configured to perform the following operations:
   cooperating with a sequencer to perform a clustering process on a plurality of original sequences to obtain a plurality of read sequences, wherein the read sequences form a cluster read set, and each of the read sequences includes a plurality of nucleotides of a genome fragment;
   generating a plurality of read binary vectors corresponding to the read sequences; and
   generating a pruned filtering binary vector according to a reference sequence, and
  a first storage module, for storing the read binary vectors and the pruned filtering binary vector, and performing an in-memory computing (IMC) to generate a filtered cluster read set according to the read binary vectors and the pruned filtering binary vector,
 and
 a processing device, coupled to the storage device, configured to perform an aligning process according to the filtered cluster read set and the reference sequence.

2. The storage system according to claim 1, wherein the first control unit generates a plurality of seeds according to the reference sequence, and generates the read binary vectors according to the seeds.

3. The storage system according to claim 2, wherein each of the read sequences has a first length, each of the seeds has a second length, and the first length is greater than the second length.

4. The storage system according to claim 2, wherein each of the read binary vectors has a plurality of binary values, when one of the seeds exists in the read sequences, each of the binary values corresponding to the seeds is "1".

5. The storage system according to claim 4, wherein the first control unit performs a logic "OR" operation according to the binary values of the read binary vectors to generate a cluster read binary vector, and the binary values of "0" in the cluster read binary vector are pruned out.

6. The storage system according to claim 2, wherein the first control unit calculates a left offset and a right offset of each of the seeds with respect to each of the read sequences, and obtains a maximum left offset and a maximum right offset.

7. The storage system according to claim 6, wherein the first control unit queries a subsequence in the reference sequence according to the maximum left offset and the maximum right offset.

8. The storage system according to claim 7, wherein the first control unit is further configured to perform the following operations:
 generating a filtering binary vector according to the subsequence, the filtering binary vector has a plurality of binary values; and
 performing a pruning operation on the filtering binary vector to obtain the pruned filtering binary vector;
 wherein the pruning operation is pruning out portions of the filtering binary vector corresponding to the binary values of "0" in the cluster read binary vector.

9. The storage system according to claim 7, wherein the first control unit generates a location information, and the location information comprises:
 the left offset and the right offset of each of the seeds, a location of the subsequence with respect to the reference sequence, and a location of each of the read sequences with respect to the reference sequence.

10. The storage system according to claim 2, wherein the first control unit establishes an index table according to the seeds, and the index table indicates a location of each of the seeds with respect to the reference sequence.

11. The storage system according to claim 10, further comprising:
 a second storage module, for storing the index table,
 wherein, the second storage module is a dynamic random access memory, and the first storage module is a NAND die.

12. The storage system according to claim 2, wherein the first storage module comprising:
- a storage block, comprising a plurality of word lines and a plurality of bit lines, each of the bit lines has a memory string,
- wherein, the storage block receives the pruned filtering binary vector from a direction of the word lines, and stores the read binary vector in the memory string of each of the bit lines.

13. The storage system according to claim 12, wherein the storage block performs an inner product operation of each of the read binary vectors and the pruned filtering binary vector, when a result of the inner product operation is less than a threshold value, the read sequence corresponding to the read binary vector is filtered out.

14. The storage system according to claim 13, wherein among all the read sequences of the cluster read set, an amount of the seeds existing in each of the read sequences has a minimum value, and the first control unit calculates the threshold value according to the minimum value of the amount of the seeds.

15. The storage system according to claim 13, wherein when the result of the inner product operation is greater than the threshold value, the read sequence corresponding to the read binary vector is reserved, and the filtered cluster read set comprises the read sequence which is reserved.

16. The storage system according to claim 15, wherein the processing device performs the aligning process, so as to align each of the read sequences in the filtered cluster read set with a subsequence of the reference sequence.

* * * * *